May 14, 1963 F. GOSSLAU ETAL 3,089,667
JET AIRCRAFT FOR SHORT TAKE-OFF AND LANDING DISTANCES
Filed April 28, 1960 6 Sheets-Sheet 1

INVENTORS
Fritz Gosslau
Kurt Reiniger
BY
Michael S. Striker

May 14, 1963  F. GOSSLAU ETAL  3,089,667
JET AIRCRAFT FOR SHORT TAKE-OFF AND LANDING DISTANCES
Filed April 28, 1960  6 Sheets-Sheet 2

INVENTORS
Fritz Gosslau
Kurt Reiniger
BY
Michael S. Striker

May 14, 1963 F. GOSSLAU ETAL 3,089,667
JET AIRCRAFT FOR SHORT TAKE-OFF AND LANDING DISTANCES
Filed April 28, 1960 6 Sheets-Sheet 5

INVENTORS
Fritz Gosslau
Kurt Reiniger
BY Michael S. Striker

May 14, 1963  F. GOSSLAU ETAL  3,089,667
JET AIRCRAFT FOR SHORT TAKE-OFF AND LANDING DISTANCES
Filed April 28, 1960  6 Sheets-Sheet 6

INVENTORS
Fritz Gosslau
Kurt Reiniger
BY
Michael S. Striker 3,089,667
JET AIRCRAFT FOR SHORT TAKE-OFF AND
LANDING DISTANCES
Fritz Gosslau, Grunwald, near Munich, and Kurt
Reiniger, Stuttgart-Zuffenhausen, Germany, assignors to Junkers Flugzeug- und Motorenwerke A.G., Munich, Germany
Filed Apr. 28, 1960, Ser. No. 25,365
Claims priority, application Germany May 2, 1959
28 Claims. (Cl. 244—12)

The present invention relates to a jet aircraft for short take-off and landing distances, and more particularly to a jet aircraft capable of taking off and landing within a fraction of the distance required by conventional jet airplanes capable of reaching extremely high, and supersonic speeds.

Modern jet propelled aircraft capable of flying at supersonic speeds, require a very long runway for take-off and landing.

It is the object of the present invention to provide a jet aircraft capable of taking off from short runways, and of landing on short runways.

A related object of the present invention is to provide a jet aircraft capable of take-off and landing on small and unpaved airfields within a short distance.

Another object of the present invention is to provide a jet aircraft capable of take-off and landing at low speeds.

The distance along which an aircraft rolls before taking off and after landing, is mainly determined by two factors:

(a) A minimum take-off speed, and a minimum landing speed are necessary for taking off and landing within a minimum rolling distance so that the kinetic energy produced by the engine during take-off, or the kinetic energy which has to be overcome by the brakes during landing, is reduced to a minimum.

(b) The greatest possible acceleration corresponding to great thrust is required for accelerating the aircraft to take-off speed within the shortest possible time and the shortest possible distance, while the greatest possible deceleration, corresponding to a braking force is required for reducing the landing speed of the aircraft until it stops within the shortest possible time and shortest possible distance.

The minimum landing and take-off speeds are determined by the wing load and the lift coefficient of the wing, and is determined by the equation $$V = 14.4 \cdot \sqrt{\frac{W}{S} \cdot \frac{1}{C_L}} \text{ km./h.}$$

In this equation, W is the weight of the aircraft, S is the effective surface of the wing $$\frac{W}{S}$$

is the wing load, and $C_L$ is the lift coefficient of the wing. From the above equation follows that for a given weight of the aircraft, the minimum speed can be lower if the wing surface and lift coefficient are correspondingly greater. Use of large wing surface for low minimum speeds, and the use of lift-increasing means, such as flaps, suction devices, and blower devices, is well-known, particularly for landing operations. However, a large wing surface results in a high drag at high speeds.

For acceleration of the aircraft during take-off, the use of thrust-increasing means, such as rockets, catapults, etc., is well-known. In order to reduce the rolling distance required for landing, it is known to produce an additional drag by brake flaps and brake parachutes, or the ground friction may be increased by wheel brakes or other friction producing means. It is also known to turn the jet engines into a position in which the jet thrust has a braking component acting in the direction of the flight, and this constructive solution is applied in aircraft for vertical take-off.

It is also known to angularly displace the jet engine, or to deflect the jet by means of an adjustable exhaust nozzle in order to obtain a vertical thrust component supporting the aircraft and relieving the wing during vertical take-off.

In accordance with the present invention, a jet engine having a very high thrust is provided, and such thrust is at least equal to the weight of the aircraft. However, in accordance with the present invention, the jet engine is not angularly displaced in the aircraft, nor is the jet deflected, since these known solutions of the problem of producing a high vertical component of the thrust, result in extremely difficult constructive problems.

In accordance with the present invention, the effective wing surface as well as the thrust of the engine are approximately twice as great as in known supersonic aircraft. The wing load is not more than 350 kg./m.² and the thrust of the engine is at least equal to the take-off weight of the aircraft, which includes full fuel tanks. During take-off the aircraft is placed in extremely steep position in which the wings have a maximum angle of incidence in which the maximum lift is produced before the stream lines break away from the wing surface.

The jet engine has a downwardly inclined outlet nozzle producing a thrust whose line of force passes through the center of gravity of the aircraft in the steeply inclined take-off position.

An alighting means or landing gear including main wheels and tail wheel means is provided which is so arranged that the wings of the aircraft have the desired great angle of incidence when the aircraft rests on the landing gear.

In the preferred embodiment of the present invention, the landing gear also includes an auxiliary wheel in the nose of the plane corresponding to a conventional tricycle landing gear, so that the aircraft may first rest on the front wheel and main wheels in a substantially horizontal position, and then turn to the take-off position resting on the rear wheel means.

Auxiliary jet means are provided on the aircraft for turning the aircraft between the two alighted positions, and such auxiliary jets may also be used for propelling the aircraft during flight, and for altering the position of the aircraft during landing approach flight.

In accordance with the present invention, the landing approach flight, and the rolling on the airfield, takes place in a landing position of the aircraft in which the angle of incidence of the wings is again the maximum. During the approach flight, extremely large parachute brakes are opened, and the surface of the parachute brakes is dimensioned in such a manner that the jet engines can run at full power as is necessary in accordance with the present invention for obtaining a very high vertical thrust component permitting the landing of the aircraft in a landing position in which the wings have the maximum angle of incidence. The interaction of the parachute brake and the jet engine is such that an approach speed is obtained which is considerably lower than the minimum speed obtainable with the wings at the same angle of incidence, but with the jet engine thrust reduced, and no parachute brake applied. After the approach landing speed of the aircraft has been sufficiently reduced, the engine thrust is reduced, and the parachute brake detached or otherwise rendered ineffective.

A jet aircraft in accordance with the present invention preferably comprises wing means having an effective surface area selected so that the ratio between the weight of the aircraft and the surface is not greater than 350 kg./m.²; jet engine means fixed on the aircraft for producing a thrust at least as great as the weight of the aircraft; and alighting means for supporting the aircraft in take-off and landing positions in which the angle of incidence of the wing means is a maximum for producing a maximum lift. The engine means is tilted with the aircraft in the take-off position so that the vertical component of the engine thrust is at least one-half of the total engine thrust.

Normally closed parachute brake means are attached to the aircraft and have in open condition an effective surface selected for producing during landing approach flight and during movement of the alighted aircraft, a drag sufficient to compensate the horizontal component of the full engine thrust which is required during landing for producing a vertical component.

The parachute brake is preferably attached to the tail fin of the aircraft at a point located in a horizontal plane passing through the center of gravity of the aircraft when the aircraft is in the landing position.

Auxiliary jet means are provided for producing turning moments on the aircraft by which the aircraft is turned from the take-off position into a normal flight position, and from a normal flight position into the landing position.

The take-off method of the present invention comprises the steps of placing the aircraft in a take-off position in which the angle of incidence of the wings is a maximum; and producing a jet thrust at least as great as the take-off weight of the aircraft and having a vertical component at least one half of the total jet thrust.

The landing method of the present invention comprises the steps of placing during landing approach flight the aircraft in a landing position in which the angle of incidence is a maximum; producing a jet thrust at least as great as the landing weight of the aircraft and having a vertical component at least one half of the total jet thrust; and simultaneously braking the aircraft by parachute brakes.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings, in which:

Referring now to the drawings, and more particularly to FIGS. 1 to 4, a fuselage 1 has alighting means including main wheel means 5, nose wheel means 6, and tail wheel mains 7 connected by first and second undercarriages to the fuselage. Jet engines 3 and 4 are fixed on the fuselage and mainly extend in direction of the longitudinal axis A of the airplane. The outlet nozzles 3a and 4a of the jet engines 3 and 4 are downwardly inclined and have axes intersecting with a horizontal axis of the plane passing through the center of gravity 10. The axes 31 and 41 of the outlet nozzles 3a and 4a are located in a plane which defines an angle $\delta$ with a plane passing through the chords 2a of the wings 2. The plane of the wing chords defines an angle $\alpha$ with a horizontal plane when the aircraft is in the take-off position shown in FIG. 7, or in the landing position shown in FIG. 12. Consequently, the plane passing through axes 31, 41 of the nozzle outlet means defines with a horizontal plane the angle $\alpha + \delta$.

Figure 3:
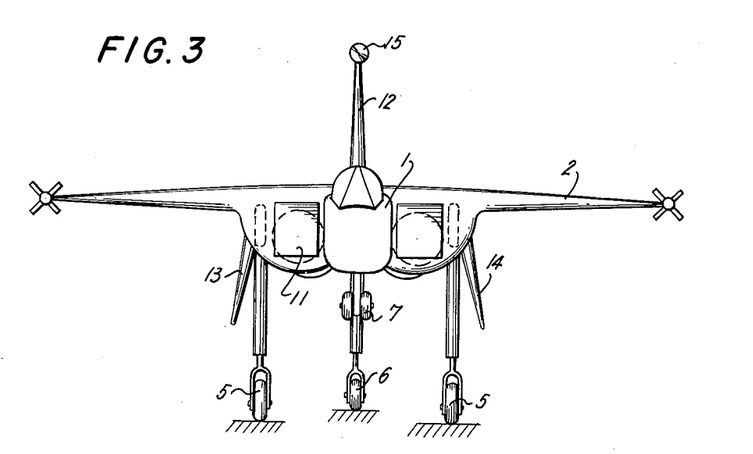
FIG. 3 is a front view of the aircraft.

The fuselage supports a tail fin 12 at the upper end of which a container for a parachute brake means is mounted. The container 15 is preferably shiftable to vary its distance from the longitudal axis of the plane and from the center of gravity 10. The jet engines 3 and 4 receive air through forwardly located inlets 11, and auxiliary fins 13 and 14 are provided which extend downwardly from the sides of the aircraft as best seen in FIGS. 3 and 4.

Figure 2:
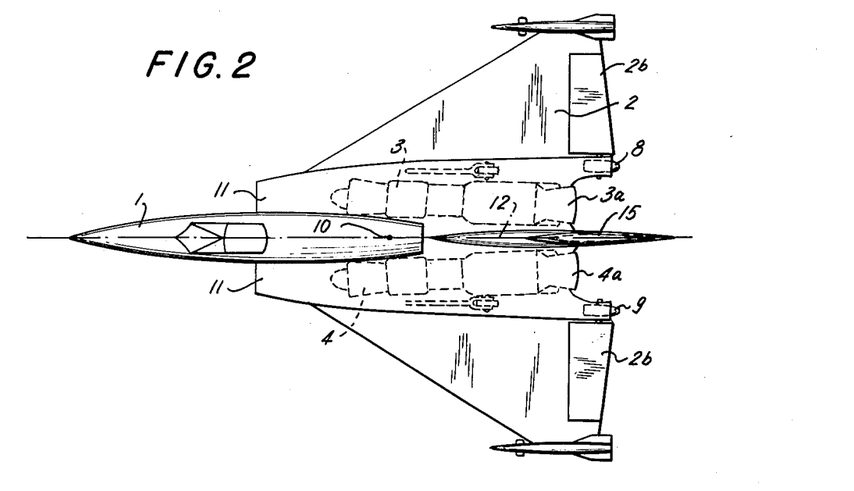
FIG. 2 is a plan view of the aircraft shown in FIG. 1.
Figure 4:
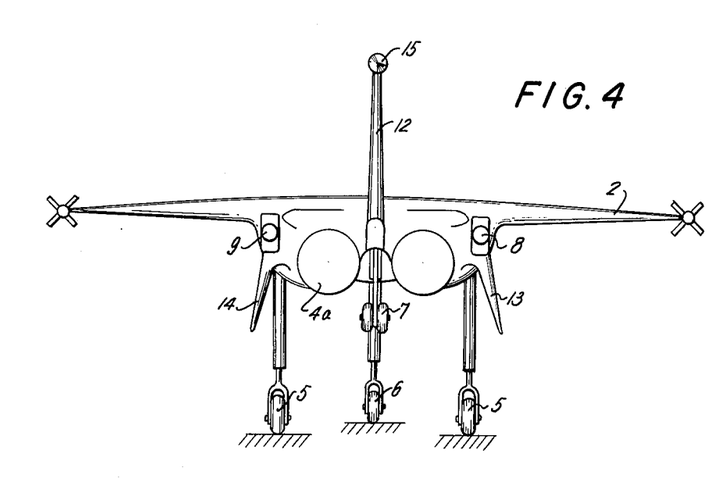
FIG. 4 is a rear view of the aircraft.

Auxiliary jet means 8 and 9 are mounted at opposite sides of the vertical plane of symmetry of the aircraft, as best seen in FIGS. 2 and 4, and each of the auxiliary jet means 8 and 9 is turnable about a horizontal axis, and may also be turnable about a vertical axis. Each of the wings 2 has elevators 2b which may be connected to the auxiliary jet means 8 or 9 on the same side for turning movement about horizontal axes.

Figure 7:
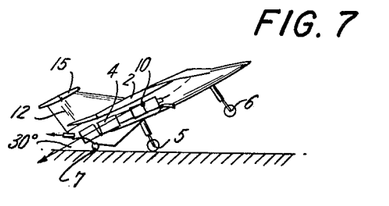
FIG. 7 is a side view of the aircraft in take-off position.
Figure 12:
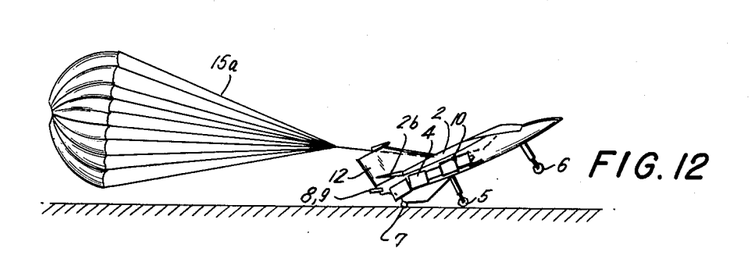
FIG. 12 is a side view of the alighted aircraft in landing position.

According to the present invention, the wheel means 5 and 7 are supported on an undercarriage in such a manner that the wings 2 have the maximum angle of incidence when the airplane rests on wheels 5 and 7 in the positions of FIGS. 7 and 12. The angle of incidence has a maximum value above which the airflow breaks off from the wing surface during take-off, or at which the airplane stalls during landing approach flight. The delta wing has very desirable characteristics for the purposes of the present invention, inasmuch as the lift increases to a very small extent as the angle of incidence is increased which may be mathematically expressed as follows:

$$\frac{dcL}{d\alpha}$$

Maximum lift is attained only when the angle of incidence is very large. On the other hand, in contrast to the straight and arrow-shaped wings, the delta wing is not subject to a sudden breaking down of the lift, so that the loss of lift at the maximum angle of incidence occurs very slowly and therefore is not dangerous.

An angle of incidence $\alpha$ of 25 degrees still produces sufficient lift if a delta wing is used. If the jet engines are mounted on the aircraft in a position parallel to the wings, a vertical thrust component of 40% is obtained which relieves the wing lift. When the outlet nozzles of the jet engines are inclined through an angle $\delta$ of 5 degrees to the wing chords 2a, a vertical thrust component of 50% is obtained, as follows from the equation $T_v = T \sin(\alpha+\delta)$. Since $(\alpha+\delta)$ is 30 degrees, sin $(\alpha+\delta)$ is 0.5, and the vertical thrust component $T_v = 0.5T$. Under these condition, the wing load is reduced to $$W = \frac{T \sin \alpha + \delta}{S}$$

wherein W is the take-off weight of the aircraft, T is the thrust of the jet engine, and S is the effective surface of the wing.

In accordance with the present invention, the thrust of the engine is selected to be at least as great as the weight W of the aircraft, so that the required aerodynamic lift can be determined by the following equation:

$$L = W - T_v = T - 0.5T = 0.5T = 0.5W$$

Assuming, from the example, that the wing load in the moment of take-off of an aircraft is $$\frac{W}{S} = 200 \text{ kg./m}^2$$

the effective aerodynamic wing load of $$\frac{L}{S}$$

is 100 kg./m.² or less due to the action of the vertical thrust component of 0.5T or 0.5W. Due to the effect of the vertical thrust component, the take-off speed is reduced to 70% as compared with known jet aircraft, and the required kinetic energy is reduced by 50% irrespective of the improvement obtained by the reduction of the wing load as compared with the corresponding values for known jet aircraft.

The horizontal thrust component depends on the cos $\alpha+\delta$, and assuming an angle of 30 degrees, the horizontal thrust component is 87% of the total thrust. Consequently, the horizontal thrust component remains within reasonable limits, and permits sufficiently rapid acceleration during the take-off. The greater aerodynamic drag of the aircraft during the last part of the take-off run in steeply tilted position is only approximately 10% of the take-off thrust and is therefore negligible.

In a preferred embodiment of the invention, the engine inlets 11 are constructed as two-dimensional supersonic planar diffusors with variable angle of displacement for producing an oblique compression shock and provided with a pivoted inlet flap. The inlet flap may be tilted down to hold the intake losses low while the aircraft moves at low flying speeds after take-off or before landing, or taxies on the ground.

Figure 8:
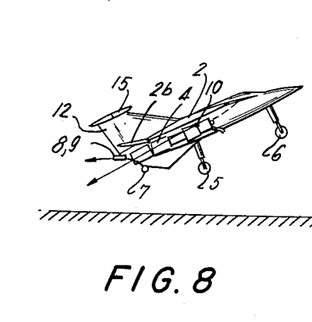
FIG. 8 is a side view of the airborne aircraft directly after take-off and still in take-off position.
Figure 10:
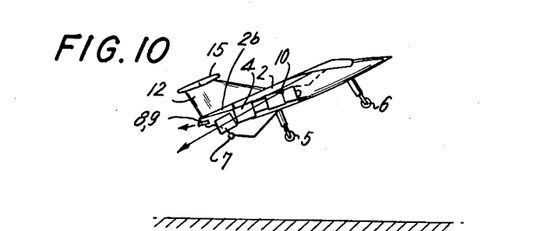
FIG. 10 is a side view of the aircraft in landing approach position.

Since in the positions shown in FIGS. 8 and 10, the aircraft is steeply tilted and moves at low speed, the conventional controls are not fully effective and auxiliary small jet means 8 and 9 are provided. The auxiliary jet means 8 and 9 may be coupled to the respective elevators 2b, or are operable independently of the elevators. The auxiliary jets 8 and 9 may be controlled by a gyroscopic automatic control apparatus for the purpose of stabilization.

Figure 9:
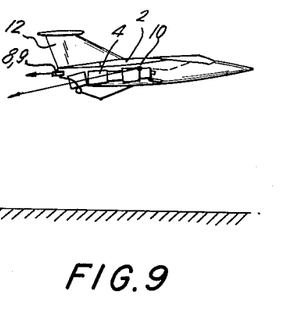
FIG. 9 is a side view of the aircraft in flight position.

In the preferred embodiment of the invention, the auxiliary jet means 8 and 9 are mounted for pivotal movement about horizontal axes between a position upwardly inclined with respect to the longitudinal axis of the aircraft, as shown in FIGS. 6, 7, 8, 10 and 11, and a position downwardly inclined to the longitudinal axis of the aircraft in which the tail end of the aircraft is raised by turning the aircraft about its horizontal axis which may be desired for turning the aircraft from the position of FIG. 8 to the position of FIG. 9. In the intermediate position of the auxiliary jet means, the thrust of the auxiliary jet means extends in direction of the longitudnial axis of the aircraft, and adds to the propulsion thrust.

When the two auxiliary jet means 8 and 9 are turned in opposite directions so that, for example, jet means 8 is downwardly inclined and jet means 9 is upwardly inclined, a turning moment about the longitudinal axis of the aircraft is obtained, which facilitates banking operations. The two auxiliary jet means 8 and 9 are independently controlled for producing different thrusts whereby a turning moment about the vertical axis of the aircraft is obtained. In a modified construction, each of the auxiliary jet means 8 and 9 is mounted on a support including a universal joint, so that the directions of the thrusts of the two auxiliary jet means can be adjusted to any desired position.

In accordance with the present invention, the aircraft is in a steeply inclined position during landing approach flight, and while decelerating after landing. In this manner, a sufficiently high vertical thrust component of the fixedly mounted jet engines is obtained. The maximum angle of incidence is again the angle of attack of the wing at which the airflow breaks off and the lift terminates. While the aircraft is tilted to obtain the greatest possible angle of incidence, the engine is run at full power, if necessary at full power with after-burning.

Since the landing position of the aircraft is the same as the take-off position, the vertical component of the thrust is again 50% of the total thrust, and of the weight of the aircraft. The landing weight of the aircraft is smaller than the take-off weight of the aircraft, since fuel has been consumed during flight and the fuel tanks are empty. Therefore, the wing load $$\frac{W_E}{S} = 150 \text{ kg./m.}^2$$

Since the vertical component of the thrust is at least one half of the total thrust, which corresponds to one half of the weight of the aircraft, the aerodynamic wing load is reduced to 75 kg./m.². This wing load determines the landing speed which may, for example, be 130 km./h. However, in order to maintain the stationary equilibrium, the horizontal thrust component must be destroyed to such an extent that no more of the horizontal thrust component remains effective as is necessary for overcoming the aerodynamic resistance of an aerodynamic braking device.

In accordance with the present invention, a parachute 15a, which normally is carried in closed condition in the container 15, is opened during landing approach flight. The parachute brake means 15a is oversized and compensates at least a major part of the horizontal component of the full engine thrust. Parachute brakes used in known landing methods have a much smaller size designed to compensate the inertia of the landing aircraft with the jet thrust substantially reduced or no longer applied.

Figure 11:
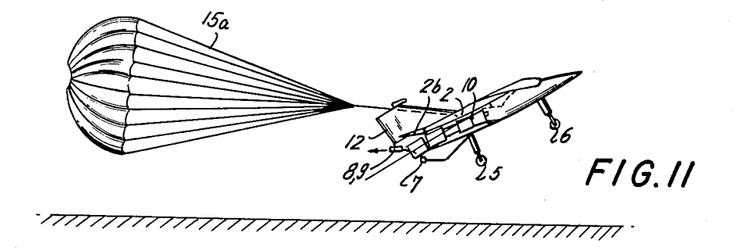
FIG. 11 is a side view of the aircraft in landing approach position with the parachute brake open.

As shown in FIGS. 11 and 12, the parachute brake 15a is attached to the tail fin 12 at a point which is located in a horizontal plane passing through the center of gravity 10 of the aircraft when the aircraft is in the steeply inclined position in which the angle of incidence of the wings 2 is a maximum. This requires attachment of the parachute to the upper side of the aircraft, for example to the top surface of the fuselage, or to bracket means secured to the fuselage and upwardly projecting from the same. However, it is preferred to use the tail fin 12 for attaching the parachute, since an aircraft having delta wings is provided with a tail fin of a shape suitable for attaching the parachute brake in accordance with the present invention, so that the brake force of the parachute brakes passes through the center of gravity when the aircraft is in landing approach position.

The parachute brake is attached to the aircraft not at the center of gravity, but a certain distance behind the center of gravity. In this manner, a remarkable stabilization of the aircraft during the landing approach flight and during the rolling in alighted condition is obtained, and such stabilization is highly desirable, since the aircraft lands at very low speed and at a great angle of incidence whereby the efficiency of the aerodynamic controls is impaired.

The combination of the parachute brake with an oversized wing, for example a delta wing, permits a safe landing operation at a low approach speed of, for example, 130 km./h.

It is evident that a low landing approach speed is a prerequisite for a short rolling distance on the airfield. During the rolling of the aircraft on the airfield, all aerodynamic braking devices are efficient only during the first part of the rolling when the speed is still sufficiently high. As the aircraft decelerates and slowly rolls to a stop, the parachute brake is no longer effective and wheel brakes or landing skis are provided for bringing the aircraft to a stop.

The effective surface of the parachute brake according to the present invention is approximately 20% greater than the effective surface of the wing, which may be expressed as 1.2S.

The horizontal component of the thrust is 0.87 of the total thrust, since it depends on cos 30°. The braking force of the parachute brake substantially corresponds to the horizontal thrust component. As previously explained, the landing weight $W_E$ is smaller than the take-off weight W, which is substantially equal to the total thrust of the engine. From this follows that the surface load of the parachute is approximately $$\frac{W_E}{S_P} = 125 \text{ kg./m.}^2$$

Figure 14:
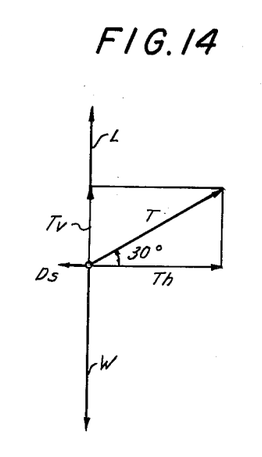
FIG. 14 is a vector diagram illustrating the forces operative during take-off of the aircraft in the positions of FIGS. 7 and 8.

The take-off of an aircraft in accordance with the present invention will now be described with reference to FIGS. 5 to 9, and to the diagram of FIG. 14.

Figure 5:
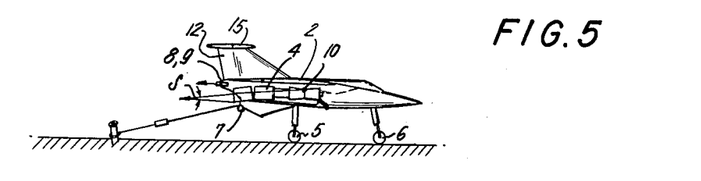
FIG. 5 is a side view of the aircraft in an alighted position.
Figure 6:
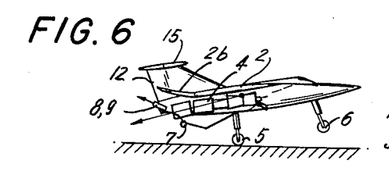
FIG. 6 is a side view of the aircraft in an intermediate alighted position.

As shown in FIG. 5, the aircraft is in an alighted substantially horizontal position resting on the main wheels 5 and on the nose wheel 6. In this position, boarding of the plane is facilitated. The aircraft is moored or anchored to the ground so that the engines can be brought up to full power with after-burning. The aircraft is then released, and taxies in the position of FIG. 5 on the forward landing gear. The direction of thrust of the auxiliary jet means 8 and 9 extends substantially through the center of gravity 10 of the aircraft.

When the aircraft has moved through substantially half the available rolling distance, the aircraft is gradually tilted by operation of the elevators 2b and by tilting the auxiliary jet means 8 and 9 in upward direction. The auxiliary jet means 8 and 9 are provided with compressed air from the compressors of the main engines 3 and 4, and include a combustion chamber and a nozzle. However, the auxiliary jet means may also be constructed as simple expansion nozzles for cold operation with compressed air, or for operation with combustion gas supplied from the main jet engines 3 and 4. The auxiliary jet means may also be small independent jet engines. In any event, the auxiliary jet means 8 and 9 are capable of providing a thrust which is almost 10% of the thrust of the main engines 3 and 4. In this manner, they can provide a turning moment sufficient to overcome an opposite moment produced by the weight of the aircraft acting at the center of gravity 10 and by the friction resistance during the rolling of the aircraft. The auxiliary jet means 8 and 9 gradually turn the rolling aircraft into the position of FIG. 7 in which the aircraft is supported on the rear undercarriage, and rests on wheels 5 and 7. In this position, the direction of the thrust of the jet engines 3 and 4 extends at an angle of 30° to a horizontal plane, and the wings have the maximum angle on incidence.

The jet engines 3 and 4 operate at full power with after-burning, and the aircraft continues to roll at increasing speed. The diagram of FIG. 14 illustrates the forces acting on the aircraft during the take-off in position of FIG. 7.

The vertical component $T_V$ of the thrust T is 0.5T, and since the thrust T is substantially equal to or greater than the weight W of the aircraft, an aerodynamic lift L is required, which is consequently substantially one half of the take-off weight W. The aerodynamic drag $D_s$ is overcome by the horizontal thrust $T_h$ which is 0.87T and enables the aircraft to accelerate.

In the position of FIG. 8, the aircraft is already airborne but still in the take-off position. The auxiliary jets 8 and 9, and the elevators 2b may now be turned into a position extending substantially in direction of the longitudinal axis of the aircraft, so that the aircraft climbs in normal flight position with the thrust of the jet engines being effective in a plane passing through the center of gravity 10 of the aircraft.

For illustrative purposes, the data of an aircraft constructed in accordance with the present invention are given as an example:

| | |
|---|---|
| Wing load at take-off weight | 200 kg./m.² |
| Rolling distance | 110 m. |
| Rolling time | 6 sec. |
| Take-off speed | 150 km./h. |
| Average acceleration on the runway | 0.75 g. |
| Effective aerodynamic wing load | 100 kg./m. |

In this table, the character g represents the acceleration of gravity expressed in m./sec.²

The above table shows that an aircraft in accordance with the present invention requires a rolling distance for take-off of 110 m., whereas known aircraft of the same type requires 800 m. rolling distance for take-off. A greater increase of the ratio between thrust and weight is within the scope of the present invention, and will result in a further reduction of the take-off distance.

The take-off operation has been described with reference to the preferred embodiment of the present invention in which in addition to the rear undercarriage, a nose wheel 6 is provided. However, the nose wheel 6 is not an essential element of the present invention, and the aircraft may be started in the position of FIG. 7, and roll the entire take-off distance in the position of FIG. 7. The position of FIG. 5 provides a greater stability during the first part of the take-off run at slower speed, and moreover is desirable for boarding and loading, and for taxiing the aircraft.

Figure 15:
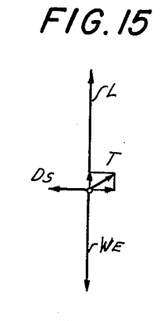
FIG. 15 is a vector diagram illustrating the forces effective during the landing approach flight in the position of FIG. 10.
Figure 16:
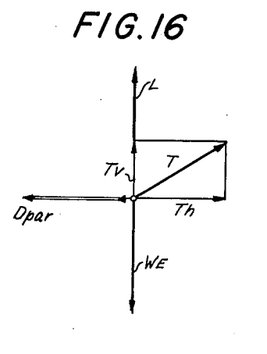
FIG. 16 is a vector diagram illustrating the forces effective when the parachute brake is open as shown in FIG. 11.
Figure 17:
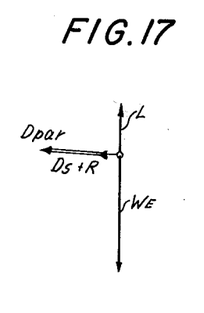
FIG. 17 is a vector digram illustrating the forces acting in the condition of FIG. 12 in which the jet engines are stopped.

A landing operation in accordance with the present invention is illustrated in FIGS. 10 to 13, and diagrammatically illustrated in FIGS. 15 to 17.

Before the aircraft approaches the landing field, the auxiliary jets 8 and 9 are tilted upwardly to turn the aircraft into the landing approach position shown in FIG. 10 in which the wings have a great angle of incidence. The elevator means 2b may also be used for this purpose. While the aircraft approaches the airfield in the position of FIG. 10, the thrust of the engines 3 and 4 is reduced, and the speed is approximately 190 km./h.

The diagram of FIG. 15 illustrates the directions of the forces in the condition of the aircraft during flight in the position of FIG. 10. The landing weight $W_E$ is effective, since the fuel tanks are empty. The thrust T of the jet engines is small, and the horizontal and vertical components of the thrust are correspondingly small. The aerodynamic drag $D_s$ is effective. The required lift L corresponds to the landing weight.

The parachute brake 15a is now opened, as shown in FIG. 11 and simultaneously the jet engines 3 and 4 are driven at full power, preferably without after-burning. The brake action of the parachute brake 15a reduces the flying speed to a landing speed of 130 km./h. while the aircraft flies stationarily without loss of height. The forces acting on the aircraft during this landing approach flight, are illustrated in the diagram of FIG. 16. Since the jet engines 3 and 4 operate at high power, the vertical thrust component $T_v$ compensates substantially one half of the landing weight $W_E$. The required lift L is also substantially one half of the landing weight. The horizontal thrust $T_h$ is compensated by the drag $D_{par}$ of the parachute brake, and by the aerodynamic drag $D_s$. Since the drag is greater than the horizontal thrust, the aircraft slows down.

In the position of FIG. 12, the aircraft has landed, and rolls on wheels 5 and 7 in a landing position in which the wings have an angle of incidence of approximately 25°. The wheel brakes are operated by an automatic brake device at a friction coefficient of 0.45. The brake action of the parachute brake is high during the first part of the rolling as long as the speed is still great. When the speed of the aircraft is reduced, the drag of the parachute is rapidly reduced, while the braking effect of the wheel brakes increases due to the reduction of the lift at lower speed of the aircraft, and reduction of the vertical thrust component obtained by first reducing the power of the engines, and then by stopping the engines. The weight of the aircraft is no longer compensated, and acts on the wheels during the second part of the rolling movement of the aircraft, so that the wheel brakes become more effective.

The distribution of forces is illustrated in the diagram of FIG. 17, which shows the landing weight $W_E$ counteracted only by the smaller lift L, since the engines produce no thrust. The parachute brake produces a smaller drag $D_{par}$, since the speed is reduced, and in addition to the drag $D_{a+r}$ is effective, which includes the brake force of the wheel brakes and the aerodynamic drag.

Figure 13:
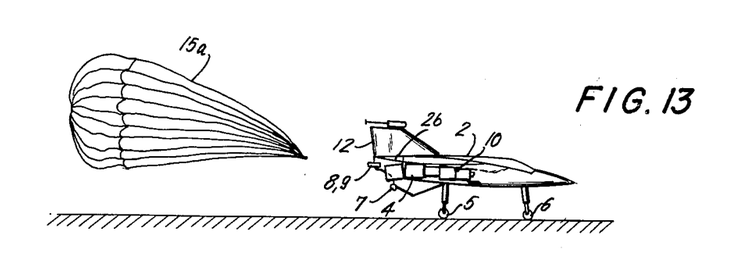
FIG. 13 is a side view of the aircraft in another alighted position with the parachute brake released.

The wheel brakes produce a turning moment on the aircraft which tends to turn the aircraft from the position shown in FIG. 12 to the position shown in FIG. 13 in which the aircraft rolls on the wheels 5 and 6. The drag of the parachute brake produces an opposite moment, but when the drag of the parachute becomes so small that the aircraft tends to tilt into the position of FIG. 13, the parachute is released and thrown off. The aircraft now rolls to a stop and is slowed down by the wheel brakes.

For illustrative purposes, the data during landing of an aircraft according to the present invention are given as an example:

| | |
|---|---|
| Wingload at landing weight | 150 kg./.m. |
| Speed of approach | 190 km./h. |
| Landing speed | 130 km./h. |
| Rolling distance | 110 m. |
| Rolling time | 6 sec. |
| Average deceleration on runway | 0.6 g. |
| Effective aerodynamic wing load | 75 kg./m.$^2$ |
| Surface load on the parachute brake | 125 kg./m.$^2$ |

The above example shows that an aircraft in accordance with the present invention can come to a stop within a distance of 110 m., whereas known aircraft of the same type requires 500 m. rolling distance for landing. The rolling distance of the aircraft according to the present invention could be further reduced by increasing the thrust of the jet engines by after-burning during the landing operation, and by providing parachute brakes of correspondingly greater effective surface. However, a parachute brake may be required whose size become impractical. Evidently, conventional brake flaps can also be used during landing operations, particularly since brake flaps are provided on the aircraft of the present invention for operation during flight.

As clearly shown in FIGS. 11 and 12, the parachute brake is attached to the aircraft in such a manner that the plane of the drag forces passes through the center of gravity of the aircraft. Several parachute brakes can be attached to the upper side of the aircraft, and in this event it is necessary to distribute the points of attachment along a plane passing through the center of gravity so that the drag produced by the parachute brakes tends to hold the aircraft in the position of FIG. 11.

Preferably, the holders 15 of the parachute, or a plurality of holders are displaceable so that turning movements can be produced for turning the aircraft about its horizontal axis until the position of FIG. 11 is obtained. In this manner, the angle of incidence can be varied.

The jet engines 3 and 4 are operated during take-off with after-burning, resulting in a thrust which is 35% higher than the rated thrust of the engine. Since during take-off considerable intake losses occur due to the low speed of the aircraft, the remaining effective thrust of the jet engines is substantially equal to the take-off weight of the aircraft.

Figure 1:
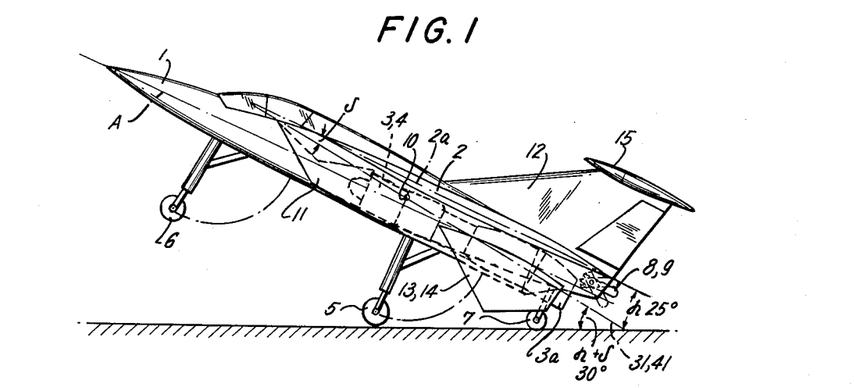
FIG. 1 is a side view of a jet aircraft in accordance with one embodiment of the present invention.
Figure 1A:
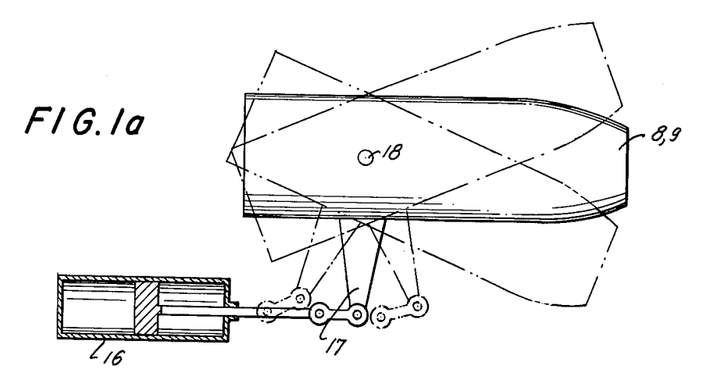
FIG. 1a is a side view on a larger scale illustrating auxiliary jet means.
Figure 1B:
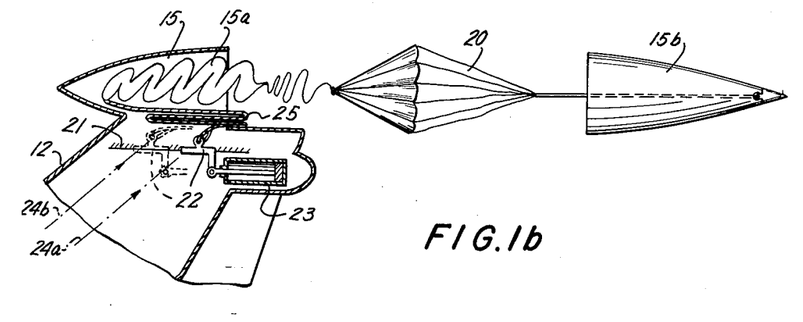
FIG. 1b is a side view on a larger scale illustrating parachute brake means.

FIGURES 1a and 1b are intended to furnish additional illustration.

The pivotal movement of the auxiliary jets 8 and 9 about axis 18 is brought about by means of booster 16 and lever 17, whereby the aircraft becomes controlable about its lateral axis.

As shown in FIG. 1b, the parachute-container 15 is mounted on the tail fin, and conical container-cap 15b is ejected and separates from container 15 when the parachute brake is released. The conical container-cap pulls out the auxiliary parachute 20 and the latter pulls out from container 15 the main parachute 15a in closed condition. When the rope 25 is pulled out, parachute 15a opens.

The main parachute is attached to a slide 22 displaceable on rail 21. The displacement is effected by means of a booster 23.

The direction of reaction of the parachute brake can thereby be changed from 24a to 24b with respect to the center of gravity of the aircraft. Through such a displacement either a moment can be created about the center of gravity of the aircraft, or a displacement of the center of gravity may be taken into account, or the angle of landing approach can be influenced by the stabilizing effect as produced by the force of reaction of the parachute, while the aircraft is alighting.

It will be understood that each of the elements described above, or two or more together, may also find a useful application in other types of jet aircraft differing from the types described above.

While the invention has been illustrated and described as embodied in a jet aircraft for short take-off and landing distances employing a parachute brake for landing, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A jet aircraft for short take-off and landing distances, comprising, in combination, wing means having a maximum lift at a given great angle of incidence; jet engine means rigidly fixed on the aircraft for producing a longitudinal jet thrust; and means on the aircraft for supporting the aircraft on the ground including first undercarriage means supporting the aircraft in take-off and landing positions in which the angle of incidence of said wing means is substantially said given angle of incidence and in which said engine means is tilted with respect to horizontal and vertical planes so that the vertical component of the jet thrust is substantially half of the weight of the aircraft whereby the aircraft is lifted during the take-off and landing partly by the lift of said wing means produced by the forward movement of the aircraft driven by the horizontal component of the jet thrust and partly by the vertical component of the jet thrust whereby short take-off and landing distances are obtained, and second undercarriage means for supporting the aircraft on the ground in another alighted position in which the longitudinal axis of the aircraft is substantially horizontal.

2. A jet aircraft as set forth in claim 1 wherein said wing means have an effective area selected so that the ratio between the weight of the aircraft and said effective area is not greater than 350 kg./m.$^2$.

3. A jet aircraft as set forth in claim 1 wherein said engine means is tilted to a horizontal plane an angle of substantially 30°.

4. A jet aircraft as set forth in claim 1 wherein said longitudinal thrust is at least as great as the weight of the aircraft.

5. A jet aircraft as set forth in claim 1 wherein said wing means have such a shape that the lift increases to a very small extent as the angle of incidence is increased.

6. A jet aircraft as set forth in claim 1 wherein said wing means have an effective area selected so that the ratio between the weight of the aircraft and said effective area is not greater than 350 kg./m.$^2$, wherein said longitudinal thrust is as least as great as said weight of said aircraft and wherein said wing means have such a shape that the lift increases to a very small extent as the angle of incidence is increased.

7. A jet aircraft for short take-off and landing distances, comprising, in combination, wing means having a maximum lift at a given great angle of incidence; jet engine means rigidly fixed on the aircraft for producing a longitudinal jet thrust; means on the aircraft for supporting the aircraft on the ground in take-off and landing positions in which the angle of incidence of said wing means is substantially said given angle of incidence and in which said engine means is tilted with respect to horizontal and vertical planes so that the vertical component of the jet thrust is substantially half of the weight of the aircraft whereby the aircraft is lifted during the take-off and landing partly by the lift of said wing means produced by the forward movement of the aircraft driven by the horizontal component of the jet thrust and partly by the vertical component of the jet thrust whereby short take-off and landing distances are obtained; and auxiliary jet means for producing turning moments on the aircraft for turning the aircraft between a position in which said wing means is substantially horizontal, and said take-off and landing positions.

8. A jet aircraft for short take-off and landing distances, comprising, in combination, wing means having a maximum lift at a given great angle of incidence; jet engine means rigidly fixed on the aircraft for producing a longitudinal jet thrust; means on the aircraft for supporting the aircraft on the ground in take-off and landing positions in which the angle of incidence of said wing means is substantially said given angle of incidence and in which said engine means is tilted with respect to horizontal and vertical planes so that the vertical component of the jet thrust is substantially half of the weight of the aircraft whereby the aircraft is lifted during the take-off and landing partly by the lift of said wing means produced by the forward movement of the aircraft driven by the horizontal component of the jet thrust and partly by the vertical component of the jet thrust whereby short take-off and landing distances are obtained; and auxiliary jet means for producing turning moments on the aircraft for turning the aircraft between a position in which said wing means is substantially horizontal, and said take-off and landing positions, said auxiliary jet means being mounted on the aircraft for turning movement about a horizontal axis between positions upwardly or downwardly tilted to the longitudinal axis of the aircraft, and an intermediate position for propelling the aircraft in a normal flight position.

9. A jet aircraft for short take-off and landing distances, comprising, in combination, wing means having a maximum lift at a given great angle of incidence; jet engine means rigidly fixed on the aircraft for producing a longitudinal jet thrust; means on the aircraft for supporting the aircraft on the ground including first under-carriage means supporting the aircraft in take-off and landing positions in which the angle of incidence of said wing means is substantially said given angle of incidence and in which said engine means is tilted with respect to horizontal and vertical planes so that the vertical component of the jet thrust is substantially half of the weight of the aircraft whereby the aircraft is lifted during the take-off and landing partly by the lift of said wing means produced by the forward movement of the aircraft driven by the horizontal component of the jet thrust and partly by the vertical component of the jet thrust whereby short take-off and landing distances are obtained, and second undercarriage means for supporting the aircraft on the ground in another alighted position in which the longitudinal axis of the aircraft is substantially horizontal; and auxiliary jet means for producing turning moments on the aircraft for turning the aircraft between a position in which said wing means is substantially horizontal, and said take-off and landing positions.

10. A jet aircraft for short take-off and landing distances, comprising, in combination, wing means having a maximum lift at a given great angle of incidence; jet engine means rigidly fixed on the aircraft for producing a longitudinal jet thrust; means on the aircraft for supporting the aircraft on the ground in take-off and landing positions in which the angle of incidence of said wing means is substantially said given angle of incidence and in which said engine means is tilted with respect to horizontal and vertical planes so that the vertical component of the jet thrust is substantially half of the weight of the aircraft whereby the aircraft is lifted during the take-off and landing partly by the lift of said wing means produced by the forward movement of the aircraft driven by the horizontal component of the jet thrust and partly by the vertical component of the jet thrust whereby short take-off and landing distances are obtained; and normally closed parachute brake means attached to the aircraft movable between a plurality of positions displaced relative to the center of gravity of the aircraft, said parachute brake means having in open condition an effective surface selected for producing during landing approach flight and during movement of the alighted aircraft a drag sufficient to compensate at least a major part of the horizontal component of the full jet thrust, and for exerting in said displaced positions a turning moment on the aircraft.

11. Jet aircraft for short take-off and landing distances, comprising, in combination, wing means having an effective surface area selected so that the ratio between the weight of the aircraft and said surface area is not greater than 350 kg./m.$^2$; jet engine means fixed on the aircraft for producing a thrust at least as great as the weight of the aircraft; alighting means for supporting the aircraft in take-off and landing positions in which the angle of incidence of said wing means is a maximum for producing a maximum lift; and normally closed parachute brake means attached to the aircraft at a point of the aircraft located in a horizontal plane passing through the center of gravity of the aircraft when the aircraft is in said landing position, said parachute brake means having in open condition an effective surface selected for producing during landing approach flight and during movement of the alighted aircraft a drag sufficient to compensate a major part of the horizontal component of the full engine thrust.

12. Jet aircraft for short take-off and landing distances, comprising, in combination, a fuselage having a tail fin; wing means secured to said fuselage having an effective surface area selected so that the ratio between the weight of the aircraft and said surface area is not greater than 350 kg./m.$^2$; jet engine means fixed on the aircraft for producing a thrust at least as great as the weight of the aircraft; alighting means for supporting the aircraft in take-off and landing positions in which the angle of incidence of said wing means is a maximum for producing a maximum lift; and normally closed parachute brake means attached to the aircraft at a point of said tail fin located in a horizontal plane passing through the center of gravity of the aircraft when the aircraft is in said landing position, said parachute brake means having in open condition an effective surface selected for producing during landing approach flight and during movement of the alighted aircraft a drag sufficient to compensate a major part of the horizontal component of the full engine thrust.

13. Jet aircraft for short take-off and landing distances, comprising, in combination, wing means having an effective surface area selected so that the ratio between the weight of the aircraft and said surface area is not greater than 350 kg./m.$^2$; jet engine means fixed on the aircraft for producing a thrust at least as great as the weight of the aircraft; alighting means for supporting the aircraft in take-off and landing positions in which the angle of incidence of said wing means is a maximum for producing a maximum lift; normally closed parachute brake means attached to the aircraft and having in open condition an effective surface selected for producing during landing approach flight and during movement of the alighted aircraft a drag sufficient to compensate a major part of the horizontal component of the full engine thrust; and movable auxiliary jet means producing turning moments on the aircraft for turning the aircraft from nose-wheel alighted position into steep take-off position and from said take-off position into a normal flight position in which said wing means have a smaller angle of incidence, and for turning said aircraft during landing approach flight from said normal flight position into said landing position.

14. Jet aircraft for short take-off and landing distances, comprising, in combination, wing means; jet engine means fixed on the aircraft for producing a thrust, said jet engine means including a jet outlet means having an axis extending downwardly inclined to the longitudinal axis of the aircraft and passing through the center of gravity of the aircraft; alighting means for supporting the aircraft in take-off and landing positions in which the angle of incidence of said wing means is a maximum for producing a maximum lift and in which said engine means is tilted with the aircraft so that the vertical component of the engine thrust is of about one half of the weight of the aircraft; and normally closed parachute brake means attached to the aircraft and having in open condition an effective surface selected for producing during landing approach flight and during movement of the alighted aircraft a drag sufficient to compensate a major part of the horizontal component of the full engine thrust.

15. Jet aircraft for short take-off and landing distances, comprising, in combination, a fuselage having a tail fin; wing means secured to said fuselage having an effective surface area selected so that the ratio between the weight of the aircraft and said surface area is not greater than 350 kg./m.$^2$; jet engine means fixed on the aircraft for producing a thrust at least as great as the weight of the aircraft, said jet engine means including a jet outlet means having an axis extending downwardly inclined to the longitudinal axis of the aircraft and passing through the center of gravity of the aircraft; alighting means for supporting the aircraft in take-off and landing positions in which the angle of incidence of said wing means is a maximum for producing a maximum lift and in which said engine means is tilted with the aircraft so that the vertical component of the engine thrust is of about one half of the total engine thrust; and normally closed parachute brake means attached to the aircraft at a point of said tail fin located in a horizontal plane passing through the center of gravity of the aircraft when the aircraft is in said landing position, said parachute brake means having in open condition an effective surface selected for producing during landing approach flight and during movement of the alighted aircraft a drag sufficient to compensate a major part of the horizontal component of the full engine thrust.

16. Jet aircraft for short take-off and landing distances, comprising, in combination, wing means having an effective surface area selected so that the ratio between the weight of the aircraft and said surface area is not greater than 350 kg./m.$^2$; jet engine means fixed on the aircraft for producing a thrust at least as great as the weight of the aircraft, said jet engine means including a jet outlet means having an axis extending downwardly inclined to the longitudinal axis of the aircraft and passing through the center of gravity of the aircraft; alighting means for supporting the aircraft in take-off and landing positions in which the angle of incidence of said wing means is a maximum for producing a maximum lift and in which said engine means is tilted with the aircraft so that the vertical component of the engine thrust is of about one half of the total engine thrust; normally closed parachute brake means attached to the aircraft and having in open condition an effective surface selected for producing during landing approach flight and during movement of the alighted aircraft a drag sufficient to compensate a major part of the horizontal component of the full engine thrust; and movable auxiliary jet means producing turning moments on the aircraft for turning the aircraft from nose-wheel alighted position into steep take-off position and from said take-off position into a normal flight position in which said wing means have a smaller angle of incidence, and for turning said aircraft during landing approach flight from said normal flight position into said landing position.

17. Jet aircraft for short take-off and landing distances, comprising, in combination, a fuselage having a tail fin; wing means secured to said fuselage having an effective surface area selected so that the ratio between the weight of the aircraft and said surface area is not greater than 350 kg./m.$^2$; jet engine means fixed on the aircraft for producing a thrust at least as great as the weight of the aircraft, said jet engine means including a jet outlet means having an axis extending downwardly inclined to the longitudinal axis of the aircraft and passing through the center of gravity of the aircraft; alighting means for supporting the aircraft in take-off and landing positions in which the angle of incidence of said wing means is a maximum for producing a maximum lift and in which said engine means is tilted with the aircraft so that the vertical component of the engine thrust is of about one half of the total engine thrust; normally closed parachute brake means attached to the aircraft rearwardly of the center of gravity of the aircraft at a point of said tail fin located in a horizontal plane passing through the center of gravity of the aircraft when the aircraft is in said landing position, said parachute brake means having in open condition an effective surface selected for producing during landing approach flight and during movement of the alighted aircraft a drag sufficient to compensate a major part of the horizontal component of the full engine thrust, said drag producing a resultant force passing through the center of gravity of the aircraft; and movable auxiliary jet means producing turning moments on the aircraft for turning the aircraft from nose-wheel alighted position into steep take-off position and from said take-off position into a normal flight position in which said wing means have a smaller angle of incidence, and for turning said aircraft during landing approach flight from said normal flight position into said landing position.

18. Jet aircraft for short take-off and landing distances, comprising, in combination, wing means having an effective surface area selected so that the ratio between the weight of the aircraft and said surface area is not greater than 350 kg./m.$^2$; jet engine means fixed on the aircraft for producing a thrust, said jet engine means including a jet outlet means having an axis extending downwardly inclined to the longitudinal axis of the aircraft and passing through the center of gravity of the aircraft; alighting means for supporting the aircraft in take-off and landing positions in which the angle of incidence of said wing means is a maximum for producing a maximum lift and in which said engine means is tilted with the aircraft so that the vertical component of the engine thrust is of about one half of the weight of the aircraft; and normally closed parachute brake means attached to the aircraft and having in open condition an effective surface selected for producing during landing approach flight and during movement of the alighted aircraft a drag sufficient to compensate a major part of the horizontal component of the full engine thrust.

19. Jet aircraft for short take-off and landing distances, comprising, in combination, wing means having an effective surface area selected so that the ratio between the weight of the aircraft and said surface area is not greater than 350 kg./m.$^2$; jet engine means fixed on the aircraft for producing a thrust; alighting means for supporting the aircraft in take-off and landing positions in which the angle of incidence of said wing means is a maximum for producing a maximum lift and in which said engine means is tilted with the aircraft so that the vertical component of the engine thrust is of about one half of the weight of the aircraft; normally closed parachute brake means attached to the aircraft and having in open condition an effective surface selected for producing during landing approach flight and during movement of the alighted aircraft a drag sufficient to compensate a major part of the horizontal component of the full engine thrust; and movable auxiliary jet means producing turning moments on the aircraft for turning the aircraft from nose-wheel alighted position into steep take-off position and from said take-off position into a normal flight position in which said wing means have a smaller angle of incidence, and for turning said aircraft during landing approach flight from said normal flight position into said landing position.

20. Jet aircraft for short take-off and landing distances, comprising, in combination, wing means having an effective surface area selected so that the ratio between the weight of the aircraft and said surface area is not greater than 350 kg./m.$^2$; jet engine means fixed on the aircraft for producing a thrust at least as great as the weight of the aircraft; alighting means for supporting the aircraft in take-off and landing position in which the angle of incidence of said wing means is a maximum for producing a maximum lift and in which said engine means is tilted with the aircraft so that the vertical component of the engine thrust is of about one half of the total engine thrust; normally closed parachute brake means attached to the aircraft at a point of the aircraft located in a horizontal plane passing through the center of gravity of the aircraft when the aircraft is in said landing position, said parachute brake means having in open condition an effective surface selected for producing during landing approach flight and during movement of the alighted aircraft a drag sufficient to compensate a major part of the horizontal component of the full engine thrust; and movable auxiliary jet means producing turning moments on the aircraft for turning the aircraft from nose-wheel alighted position into steep take-off position and from said take-off position into a normal flight position in which said wing means have a smaller angle of incidence, and for turning said aircraft during landing approach flight from said normal flight position into said landing position.

21. Jet aircraft for short take-off and landing distances, comprising, in combination, wing means; jet engine means fixed on the aircraft for producing a thrust; alighting means for supporting the aircraft in take-off and landing positions in which the angle of incidence of said wing means is a maximum for producing a maximum lift and in which said engine means is tilted with the aircraft so that the vertical component of the engine thrust is of about one half of the weight of the aircraft; and normally closed parachute brake means attached to the aircraft at a point of the aircraft located in a horizontal plane passing through the center of gravity of the aircraft when the aircraft is in said landing position, said parachute brake means having in open condition an effective surface selected for producing during landing approach flight and during movement of the alighted aircraft a drag sufficient to compensate a major part of the horizontal component of the full engine thrust.

22. Jet aircraft for short take-off and landing distances, comprising, in combination, wing means; jet engine means fixed on the aircraft for producing a thrust; alighting means for supporting the aircraft in take-off and landing positions in which the angle of the incidence of said wing means is a maximum for producing a maximum lift and in which said engine means is tilted with the aircraft so that the vertical component of the engine thrust is of about one half of the weight of the aircraft; normally closed parachute brake means attached to the aircraft at a point of the aircraft located in a horizontal plane passing through the center of gravity of the aircraft when the aircraft is in said landing position, said parachute brake means having in open condition an effective surface selected for producing during landing approach flight and during movement of the alighted aircraft a drag sufficient to compensate a major part of the horizontal component of the full engine thrust; and movable auxiliary jet means producing turning moments on the aircraft for turning the aircraft from nose-wheel alighted position into steep take-off position and from said take-off position into a normal flight position in which said wing means have a smaller angle of incidence, and for turning said aircraft during landing approach flight from said normal flight position into said landing position.

23. Jet aircraft for short take-off and landing distances, comprising, in combination, wing means having an effective surface area selected so that the ratio between the weight of the aircraft and said surface area is not greater than 350 kg./m.$^2$; jet engine means fixed on the aircraft for producing a thrust at least as great as the weight of the aircraft; alighting means for supporting the aircraft in take-off and landing positions in which the angle of incidence of said wing means is a maximum for producing a maximum lift; normally closed parachute brake means attached to the aircraft and having in open condition an effective surface selected for producing during landing approach flight and during movement of the alighted aircraft a drag sufficient to compensate a major part of the horizontal component of the full engine thrust; and movable auxiliary jet means producing turning moments on the aircraft for turning the aircraft from nose-wheel alighted position into steep take-off position and from said take-off position into a normal flight position in which said wing means have a smaller angle of incidence, and for turning said aircraft during landing approach flight from said normal flight position into said landing position, said auxiliary jet means being mounted on the aircraft for turning movement about a horizontal axis between positions upwardly and downwardly tilted to the longitudinal axis of the aircraft, and an intermediate position for propelling the aircraft in normal flight position.

24. Jet aircraft as set forth in claim 23 wherein said auxiliary jet means include jets located on opposite sides of the longitudinal vertical plane of symmetry of the aircraft.

25. Jet aircraft for short take-off and landing distances, comprising, in combination, wing means having an effective surface area selected so that the ratio between the weight of the aircraft and said surface area is not greater than 350 kg./m.²; jet engine means fixed on the aircraft for producing a thrust at least as great as the weight of the aircraft; alighting means including first undercarriage means supporting the aircraft in take-off and landing positions in which the angle of incidence of said wing means is a maximum for producing a maximum lift and second undercarriage means for supporting the aircraft in another alighted position in which the longitudinal axis of the plane is substantially horizontal, said alighting means include main wheel means, nose wheel means, and tail wheel means, and friction brakes at least for said main wheels, the center of gravity of the aircraft being located forwardly of said main wheel means in said other alighted position, and rearwardly of said main wheel means in said take-off and landing positions; and movable auxiliary jet means producing turning moments on the aircraft for turning the aircraft from said other alighted position into said take-off position, and from said take-off position into a normal flight position in which said wing means have a smaller angle of incidence.

26. Jet aircraft for short take-off and landing distances, comprising, in combination, wing means having an effective surface area selected so that the ratio between the weight of the aircraft and said surface area is not greater than 350 kg./m.²; jet engine means fixed on the aircraft for producing a thrust at least as great as the weight of the aircraft; alighting means including first undercarriage means having brake means and supporting the aircraft in take-off and landing positions in which the angle of incidence of said wing means is a maximum for producing a maximum lift and second undercarriage means for supporting the aircraft in another alighted position in which the longitudinal axis of the plane is substantially horizontal; and normally closed parachute brake means attached to the aircraft and having in open condition an effective surface selected for producing during landing approach flight and during movement of the alighted aircraft a drag sufficient to compensate a major part of the horizontal component of the full engine thrust, said parachute brake means being detachable from the aircraft so that the aircraft turns from said landing position to said other alighted position when said parachute brake means is detached and said brake means are applied.

27. Jet aircraft for short take-off and landing distances, comprising, in combination, wing means having an effective surface area selected so that the ratio between the weight of the aircraft and said surface area is not greater than 350 kg./m.²; jet engine means fixed on the aircraft for producing a thrust at least as great as the weight of the aircraft; alighting means including first undercarriage means having brake means and supporting the aircraft in take-off and landing positions in which the angle of incidence of said wing means is a maximum for producing a maximum lift and second undercarriage means for supporting the aircraft in another alighted position in which the longitudinal axis of the plane is substantially horizontal; normally closed parachute brake means attached to the aircraft and having in open condition an effective surface selected for producing during landing approach flight and during movement of the alighted aircraft a drag sufficient to compensate a major part of the horizontal component of the full engine thrust, said parachute brake means being detachable from the aircraft so that the aircraft turns from said landing position to said other alighted position when said parachute brake means is detached and said brake means are applied; and movable auxiliary jet means producing turning moments on the aircraft for turning the aircraft from said other alighted position into said take-off position, and from said take-off position into a normal flight position in which said wing means have a smaller angle of incidence, and for turning said aircraft during landing approach flight from said normal flight position into said landing position.

28. Jet aircraft as set forth in claim 27 wherein said alighting means includes main wheel means, nose wheel means, and tail wheel means, and friction brakes at least for said main wheels; and wherein the center of gravity of the aircraft is located forwardly of said main wheel means in said other alighted position, and rearwardly of said main wheel means in said take-off and landing positions.

References Cited in the file of this patent
UNITED STATES PATENTS

| | | |
|---|---|---|
| 1,499,472 | Pratt | July 1, 1924 |
| 1,875,267 | Savoja | Aug. 30, 1932 |
| 2,145,459 | Rhines | Jan. 31, 1939 |
| 2,246,716 | Bottrill | June 24, 1941 |
| 2,481,379 | Zimmerman | Sept. 6, 1949 |
| 2,513,867 | Heffernan | July 4, 1950 |
| 2,678,783 | Meyers | May 18, 1954 |
| 2,734,702 | Northrop | Feb. 14, 1956 |
| 2,761,634 | Velaquez | Sept. 4, 1956 |
| 2,929,580 | Ciolkosz | Mar. 22, 1960 |
| 2,958,480 | Saulnier | Nov. 1, 1960 |
| 2,971,725 | Jakimiuk | Feb. 14, 1961 |

FOREIGN PATENTS

| | | |
|---|---|---|
| 787,102 | Great Britain | Dec. 4, 1957 |